United States Patent [19]

Hardy, Jr.

[11] Patent Number: 5,629,997
[45] Date of Patent: May 13, 1997

[54] METHOD AND APPARATUS FOR COUPLING LASER DIODE BEAMS TO OPTICAL FIBERS AND ACHIEVING HIGH POWER DENSITIES

[75] Inventor: Arthur H. Hardy, Jr., Santa Barbara, Calif.

[73] Assignee: Santa Barbara Research Center, Goleta, Calif.

[21] Appl. No.: 552,891

[22] Filed: Nov. 3, 1995

[51] Int. Cl.$^6$ .................................................. G02B 6/32
[52] U.S. Cl. ................................................. 385/33; 385/146
[58] Field of Search ................................. 385/15, 31, 33, 385/34, 35, 38, 116, 121, 146

[56] References Cited

U.S. PATENT DOCUMENTS

| | | | |
|---|---|---|---|
| 4,952,022 | 8/1990 | Genovese | 385/116 |
| 5,080,706 | 1/1992 | Snyder et al. | 65/102 |
| 5,127,068 | 6/1992 | Baer et al. | 385/34 |
| 5,268,978 | 12/1993 | Po et al. | 385/33 |
| 5,343,546 | 8/1994 | Cronin et al. | 385/52 |

FOREIGN PATENT DOCUMENTS

| | | | |
|---|---|---|---|
| 1-315708 | 12/1989 | Japan | 385/33 |
| 1332253 | 8/1987 | U.S.S.R. | 385/34 |

OTHER PUBLICATIONS

Jones, Michael D., et al., "Compact Robust Fiber–Optic Diode Laser Array Module for Solid–State Laser Pumping and Beacon Applications", *Proceedings of SPIE—The International Society for Optical Engineering*, v 2148, 1994, pp. 332–338 [No Month].

Primary Examiner—John D. Lee
Attorney, Agent, or Firm—William C. Schubert; Charles D. Brown; Wanda K. Denson-Low

[57] ABSTRACT

An optical coupler for coupling energy from a laser diode bar is disclosed. The coupler includes multiple rectangular optical fibers that each have a cylindrical lens which is an integral part of each fiber end. The fiber ends are held in a fixed spatial relationship by a retainer. In one coupler embodiment, each fiber end is shaped to define the cylindrical lens. In another coupler embodiment, each fiber end carries a lens shaped from an optical medium. Methods of making the couplers are also disclosed.

18 Claims, 6 Drawing Sheets

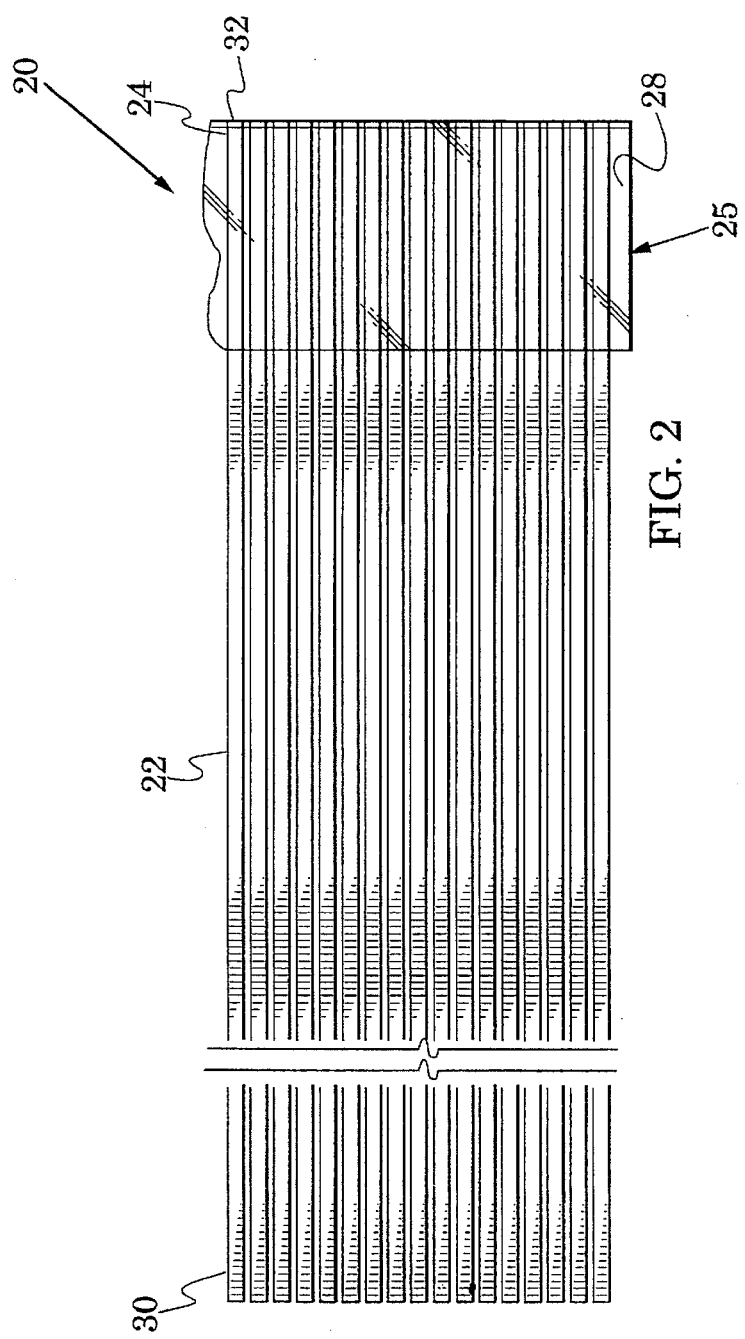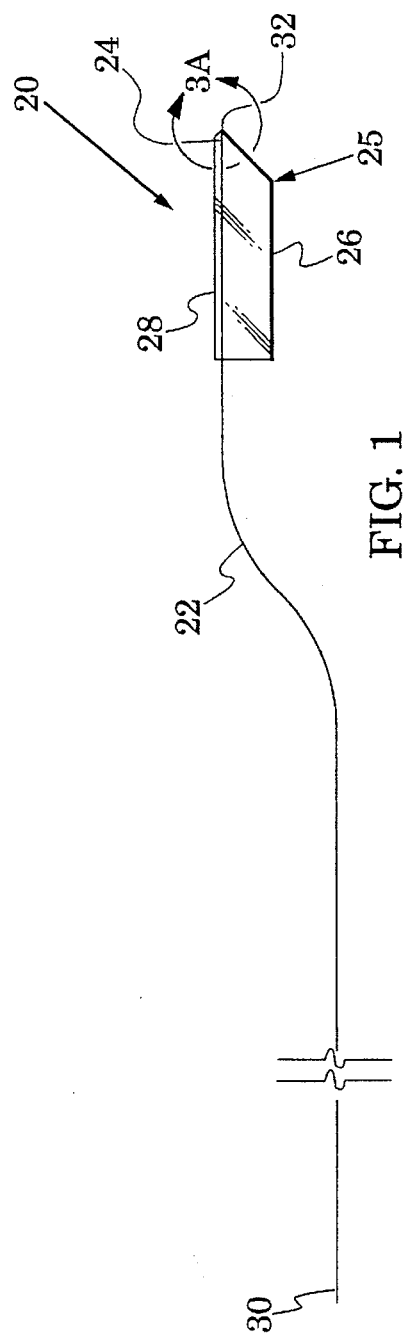

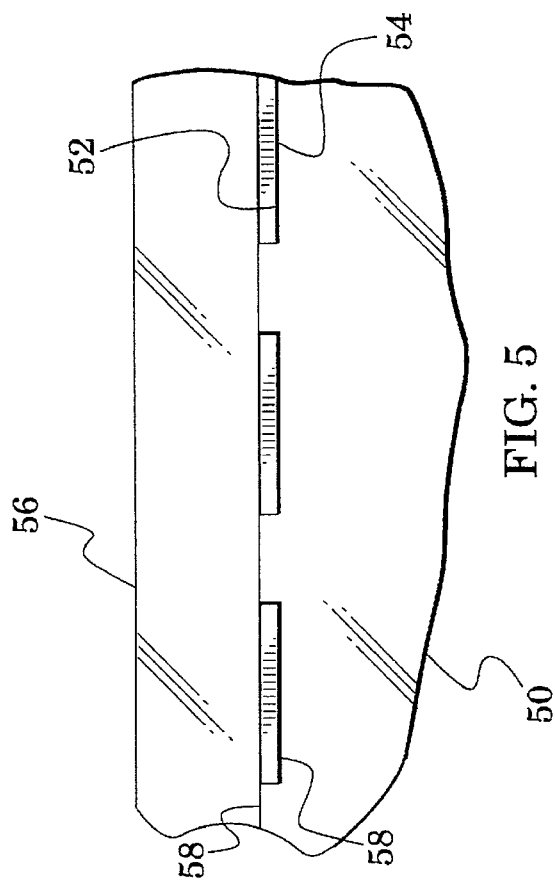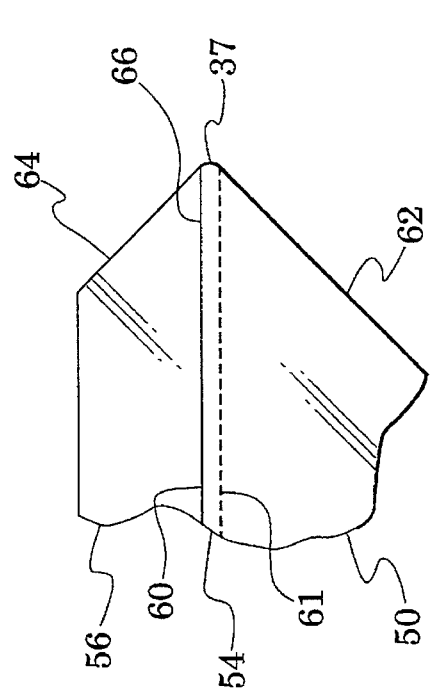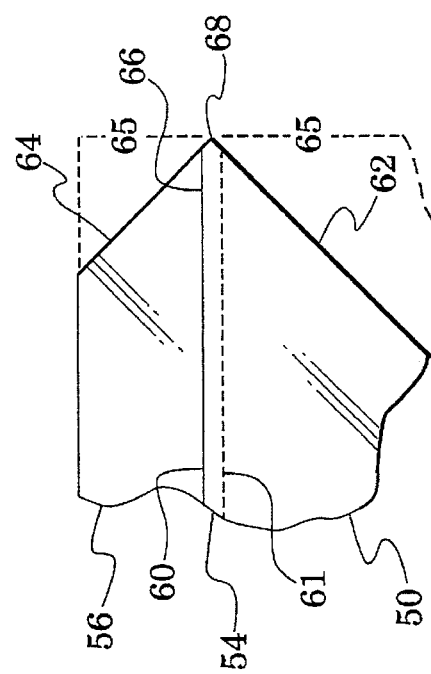

METHOD AND APPARATUS FOR COUPLING LASER DIODE BEAMS TO OPTICAL FIBERS AND ACHIEVING HIGH POWER DENSITIES

BACKGROUND OF THE INVENTION

1. Field of the Invention

The present invention relates generally to optical fibers and more particularly to methods and apparatus for coupling laser diode beams to optical fibers.

2. Description of the Related Art

Semiconductor laser diodes have very small emitting apertures whose dimensions are typically in the range of 1×200 microns. They generally have a greater beam divergence (the included angle between opposite beam edges) than other lasers. In a conventional three-axis, rectangular coordinate system, let the laser junction length coincide with the y-axis and let the x-axis be the direction of propagation of the laser radiation pattern as well as the system's optic axis. In the x-y plane, a typical divergence for semiconductor lasers is plus and minus five degrees from the optic axis. In the x-z plane, a typical divergence is plus and minus twenty degrees from the optic axis.

A laser diode beam can therefore be said to have a numerical aperture in a slow plane (x-y plane, the plane of the diode's junction) and a greater numerical aperture in a fast plane (x-z plane, the plane orthogonal to that of the diode's junction). In either the fast or slow planes, the numerical aperture (N.A.) of the beam is the product of the sine of one half the respective divergence angle and the index of refraction of the transmission medium.

Multiple laser diodes can be fabricated, in bars and arrays which can contain a large number, e.g., 10 to 100, of spaced diodes and produce considerable power, e.g., up to 30 watts cw. Many applications (such as catherization, photo dynamic therapy, welding, soldering and marking) require that high power be delivered through a relatively small fiber optic system. If the energy of these laser diodes is to be effectively used in a fiber optic system, their light-emitting apertures must be coupled to the light-carrying core of the system's optical fibers. Because optical-fiber cross sections and laser-diode emitting apertures are typically so small (measured in microns) and because laser diodes have a large numerical aperture along their high divergence axes, this coupling is complicated and requires precise mechanical alignment.

The problem has been addressed in copending application Ser. No. 08/355,878, filed Dec. 13, 1994 in the name of Arthur H. Hardy, Jr and Leland V. Gardner, and assigned to Santa Barbara Research Center, the assignee of the present invention. In this invention, it was recognized that a low NA fiber optical system inherently produced the highest energy density in any subsequent optical output system. For semiconductor lasers with their different divergence characteristics in orthogonal axes, the first step in the approach is to reduce the N.A. of the fast plane to be approximately equal to that of the slow plane. This balanced N.A. allowed the combining of both planes into a low N.A. fiber set which achieves very high power densities at the output of the system. It was also recognized that power densities could be increased by matching the cross section dimension of the fibers to that of the laser diodes (rectangular laser junction in most semiconductor lasers).

In the above associated patent application, couplers were formed that included lenses arranged to reduce the fast N.A. and direct beams to either an off-axis parabolic reflecting element (first embodiment) or an elliptical reflecting surface (second embodiment). This approach then led to the methods and apparatus of the present invention which utilize multiple fibers with formed or molded lens couplers that are mounted in a retainer for ease of alignment. It is primarily intended for coupling multiple lasers and laser diode bars in an easily assembled single unit.

This coupling problem has also been addressed in U.S. Pat. No. 5,127,068 which describes an apparatus for coupling multiple-emitter laser diodes to a multimode optical fiber. The apparatus includes a cylindrical microlens, e.g., a small diameter optical fiber, to collimate the laser diode output radiations and couple them into a transmission optical fiber. The collimation is performed in the high divergence axis of the laser diode and the diameter of the microlens is chosen to substantially equal the diameter of the transmission fiber.

In an embodiment, an optical fiber array is coupled to a diode bar which has a plurality of spaced laser diode emitters. Each fiber of the fiber array is spaced to match the diode spacing of the diode bar and the microlens optical fiber is positioned between the diode bar and the fiber array and oriented to extend along the length of the laser diode bar. In this embodiment, the fibers of the array have a 250 micron diameter. The microlens also has a 250 micron diameter fiber, and is spaced approximately 50 microns from the laser diode emitting surface and about 300 microns from the ends of each of the optical fibers.

This arrangement requires several small parts to be precisely assembled over the full length of the diode bar with accurate spacing both horizontally and vertically. Spacings this small present difficult alignment problems but are necessary because of the short focal length microlens which is dictated by the coupling structure. The complete sequence of alignment and assembly is a difficult and time-consuming operation. In addition, great care must be taken to keep the optical surfaces free of any assembly adhesive or other contaminant.

U.S. Pat. No. 5,080,706 describes a method of forming cylindrical microlenses having various optically-desirable focusing shapes. Such cylindrical lenses could be used in a manner taught by U.S. Pat. No. 5,127,068 but this use would do little to resolve the associated assembly problems.

In another coupling approach (Jones, Michael D., et al.. "Compact Robust Fiber-Optic Diode Laser Array Module for Solid-State Laser Pumping and Beacon Applications", *Proceedings of SPIE—The International Society for Optical Engineering*, v 2148, 1994, pp. 332–338) a cylindrical lens is positioned across a large core diameter fiber and the numerical aperture of the fiber is selected to conform with the numerical aperture along the slow plane of the laser diode beam. Although this structure can successfully couple the laser diode beam into a cylindrical optical fiber, the resulting power density is limited because of the disparity between the long, thin rectangular shape of the emitting apertures of laser diodes and the cylindrical shape of the optical fiber. In addition, a separate, delicate microlens must be fabricated and cemented to the fiber. This is a difficult manufacturing operation, further complicated by the additional constraint of keeping epoxy off the front surface of the lens.

SUMMARY OF THE INVENTION

The present invention is directed to optical couplers which are easily aligned with laser diodes and laser diode bars and which can efficiency receive and transmit the laser diode radiation with its different numerical apertures.

This goal is realized with a coupler which includes a rectangular optical fiber and a convex cylindrical lens which is formed across an end of the fiber. The optical fiber has a pair of broad walls, a pair of narrow walls and a numerical aperture which is preferably selected to be slightly greater than the radiation's numerical aperture along its slow plane. The cylindrical lens is shaped to define a curved surface and which is configured to reduce the laser's fast numerical aperture to be equal to or less than that of laser's slow numerical aperture and equal to or slightly less than a conduit fiber's numerical aperture. Accordingly, the coupler is oriented to receive the radiation with the optical cross section of its lens substantially parallel with the laser's fast numerical aperture.

The rectangular cross-sectional shape of the optical fiber is selected to closely conform with the rectangular shape of typical laser diode apertures. Consequently, the resulting power density within the fiber is enhanced because the rectangular acceptance region of the fiber has a high degree of conformity with the rectangular-shaped laser diode.

In one coupler embodiment, the fiber end is ground to form the cylindrical lens surface. In another coupler embodiment, the cylindrical lens is molded as an extension of the fiber end. The molded extension preferably can also form a rib which protrudes past the curved lens surface for its protection.

These individual couplers are also combined to form composite optical couplers for receiving a plurality of radiation beams. In the composite couplers, a plurality of individual couplers are held in a fixed spatial relationship by a retainer. In one embodiment, the retainer has first and second clamp members and a plurality of channels are formed by at least one of the clamp members. Each of the channels is configured to receive a different one of the fibers. In another retainer embodiment, the retainer includes spacers which are positioned between different pairs of the fibers and between the first and second clamp members.

The invention is also directed to methods for forming the optical couplers. In a first method, an end of a rectangular fiber is captured between first and second clamp members, the fiber's broad walls are ground to form a substantially V-shaped end and the V-shaped end is rounded to form the curved surface.

In a second method, a mold is provided with a groove which has a transverse profile. After an end of a fiber is received into the groove, the groove is filled with an optical-grade plastic. The plastic is allowed to solidify into a lens which adheres to the fiber's end. The groove's transverse profile is configured to define a predetermined optical cross section for the lens.

The present invention provides efficient coupling apparatus between lasers and fibers that is especially advantageous for coupling multiple laser junctions in a small volume at low cost. A specific list of advantages for the invention includes the following:

1) high power density laser radiation patterns can be achieved using this invention because the apparatus provides an output with low numerical aperture, (reduced beam divergence), which is the basis for ultimately producing very high density beams;

2) the invention described herein provides couplers that efficiently match the most common laser emission patterns, i.e., the rectangular configuration of semiconductor laser diodes;

3) this invention also provides increased power densities with apparatus designed for coupling multiple emitters (laser, diode bars) into a concentrated beam;

4) increased coupling efficiency is achieved because this apparatus employs a lens surface formed from a fiber end which inherently provides shorter distances between laser and fiber which, in turn, leads to higher power density outputs;

5) coupling efficiency is also increased because only one optical surface loss is involved rather than three as in some previous solutions;

6) important low cost manufacturing advantages are obtained because the methods and apparatus of this invention provide ease of alignment and assembly for multiple laser couplers in a single assembly, and 7) an additional assembly advantage is obtained because the assembled coupler requires fewer parts than existing approaches.

The novel features of the invention are set forth with particularity in the appended claims. The invention will be best understood from the following description when read in conjunction with the accompanying drawings.

BRIEF DESCRIPTION OF THE DRAWINGS

FIG. 1 is a side elevation view of an optical coupler for coupling multiple laser diode beams to a plurality of optical fibers;

FIG. 2 is a top plan view of the coupler of FIG. 1;

FIG. 4 is an enlarged view similar to FIG. 3A which illustrates the initial steps in a method for forming the coupler of FIGS. 1 and 2;

FIG. 5 is front elevation view of the structure of FIG. 4;

FIG. 6 is a view similar to FIG. 4 showing; subsequent steps in forming the coupler of FIGS. 1 and 2;

FIG. 7 is a view similar to FIG. 6 showing; subsequent steps in forming the coupler of FIGS. 1 and 2;

DESCRIPTION OF THE INVENTION

Figure 3B:
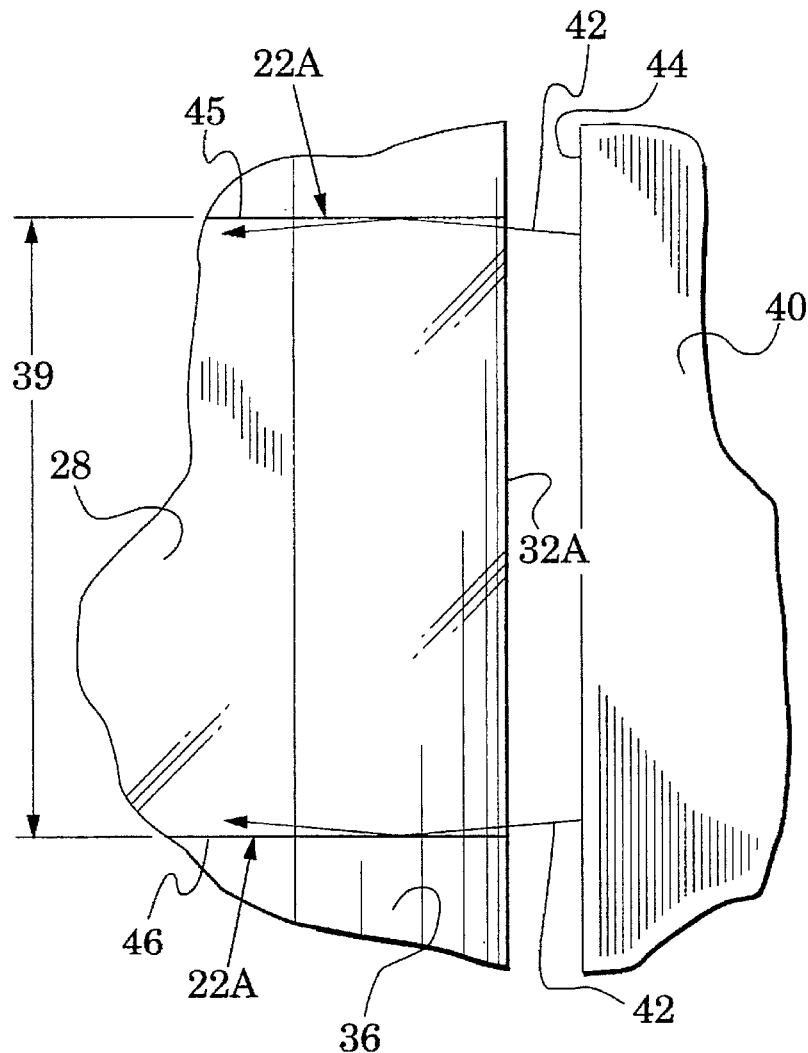
FIG. 3B is a top plan view of the structures of FIG. 3A.
Figure 3A:
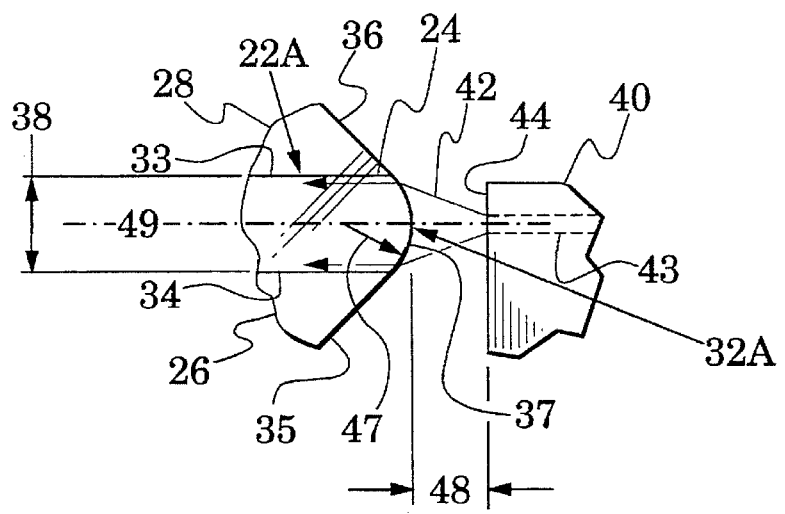
FIG. 3A is an enlarged view of the structure within the curved line 3A of FIG. 1, showing its use in association with a laser diode bar.

An optical coupler 20 is illustrated in FIGS. 1 and 2 (assembly of multiple fibers and lasers) and in FIGS. 3A and 3B (single fiber and laser within the assembly). The coupler 20 includes a plurality of spaced optical fibers 22, each having an entrance end 24 that is captured in a retainer 25.

The retainer 25 includes clamp members in the form of a glass substrate 26 and a glass cover sheet 28. The clamp members hold the fibers 22 in a fixed, spatial relationship with each other. The length of each optical fiber 22 is chosen so that the fiber can be positioned along a path that places its exit end 30 at a selected location for delivery of laser energy that is coupled into its entrance end 24.

Each entrance end 24 has a cylindrical lens 32. In particular, each optical fiber entrance end 24 is shaped to form the lens 32. The substrate 26 and cover sheet 28 are ground away from opposite broad walls 33 and 34 of the optical fibers 22 so that their respective beveled surfaces 35 and 36 are a continuation of a curved surface 37 of the cylindrical lens as shown in FIG. 3A. Each fiber 22 is rectangular with a thickness 38 and a width 39 (FIGS. 3A and 3B).

The coupler 20 is designed for coupling laser energy from a diode bar which emits laser beams from a plurality of apertures that are spaced along a common plane. Accordingly, in the enlarged views of FIGS. 3A and 3B, a laser diode bar 40 is spaced from the coupler 20 and positioned so that each of its apertures in face 44 is opposite the receiving end 24 of a different one, e.g., 22A, of the rectangular optical fibers. The beam 42, emitted by an aperture of the laser diode bar 40, is received into the optical fiber 22A through its lens 32A.

The numerical aperture of each optical fiber 22 is selected to be compatible with the numerical aperture of the laser beam 42 along its slow plane (the plane parallel with its respective diode junction 43). Thus, the beam 42 will be received in its slow plane by the optical fiber 22A and will be guided along the fiber by total internal reflection from the fiber's opposed narrow walls 45 and 46. As shown in FIG. 3A, the curved surface 37 is configured to reduce the laser beam's numerical aperture along its fast plane (the plane orthogonal to its respective diode junction 43) to a numerical aperture that is also compatible with the selected numerical aperture of the optical fiber 22A. Accordingly, the optical cross section of the curved surface 37 of the cylindrical lens 32 is arranged to be substantially perpendicular to a central plane 49 of the fiber 22A. FIG. 3A illustrates a specific example of a curved surface 37 in which the lens 32A has reduced the beam's numerical aperture along its fast plane to nearly zero, i.e., the beam 42 has been nearly collimated in this plane.

As shown in FIG. 3A, the coupler 20 and the laser bar 40 are aligned along the plane 49 and spaced apart by a space 48. In operation of the coupler 20, the N.A, in the slow plane of the beam 42 remains unchanged with passage through the lens 32, because the lens 32 is a cylindrical lens with the cylinder axis parallel with the long dimension of the laser diode junctions. In contrast, the N.A. in the fast plane of the beam 42 is reduced by the lens 32.

For example, the lens 32 can be configured with curved surface 37 which reduces the N.A. in the fast plane to substantially equal the N.A. of the slow plane. If this reduced N.A. in the fast plane (which is also the N.A. in the slow plane) is greater than the N.A. of the fibers 22, radiation energy will penetrate the cladding of the fibers 22 and be lost. Alternatively, if this reduced N.A. in the fast plane is less than the N.A. of the fibers 22, the beam N.A. will expand with transit through the fibers until it matches the N.A. of the fibers.

Accordingly, the N.A. of the fibers 22 is preferably selected to be equal to or slightly greater than the N.A. in the slow plane of the beam 42 and the lens 32 is configured to reduce the N.A. in the fast plane, of the beam 42 to be equal to or less than that of the slow axial plane. A slightly greater N.A. of the fibers 22 prevents energy loss through the fiber cladding and, in addition, can be designed to compensate for slight angular misalignment between the diode apertures and the fibers 22.

A method for making the optical coupler 20 is illustrated in FIGS. 4, 5, 6 and 7. FIG. 4 is a view of the same coupler area of FIG. 3A before complete formation of the coupler 20. In FIGS. 4 and 5, a glass substrate 50 has been shaped to define spaced channels 52 whose dimensions are selected to each receive an optical fiber 54. The spacing between channels 52 is selected to match the spacing between the emitting apertures of a diode bar whose laser beams are to be coupled into the optical fibers 54. A cover sheet 56 is positioned as shown in FIGS. 4 and 5 to capture the optical fibers 54 between it and the substrate 50. Prior to final assembly, an epoxy 58 is placed on all mating surfaces and the fibers 54, the substrate 50 and cover sheet 56 reassembled and permanently joined by the epoxy. The epoxy preferably has an index of refraction that is equal to or less than that of the fiber's cladding.

As shown in FIG. 6, the substrate 50 and cover sheet 56 are then ground from the opposed broad walls 60, 61 of the fibers 54 to form respective ground surfaces 62 and 64; the broken lines 65 indicate the outlines of the substrate 50 and cover sheet 56 prior to this operation. The grinding operation is conducted so as to leave the entrance end 66 of the optical fibers 54 with a V-shaped cross section 68 along a plane that is orthogonal to their broad walls 60 and 61. This operation can be accomplished with any material removal processes routinely used in optical fiber art, e.g., grinding and lapping, and the ground angle is preferably tangent to the top and bottom of the selected cylindrical lens.

Finally, as shown in FIG. 7, the V-shaped fiber end 68 is ground and polished to achieve the curved surface 37, e.g., one having a constant radius of curvature (47 in FIG. 3A), which reduces all rays to angles equal to or less than those of the slow N.A. beam. This operation can be accomplished by any appropriate process routinely used in the optical fiber fabrication. The result of this method is a single assembly which is ready for use with laser diode bars with no requirement for alignment of individual laser junctions. Also, shaping the ends of each fiber has eliminated the need for a separate lens to be held in space.

Figure 9:
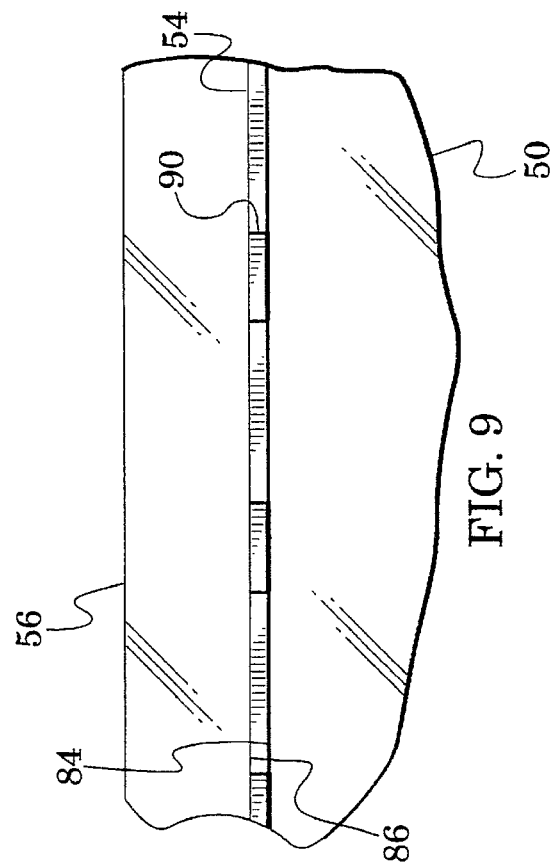
FIG. 9 is a view similar to FIG. 5 illustrating an alternate method for forming the coupler of FIGS. 1 and 2.
Figure 8:
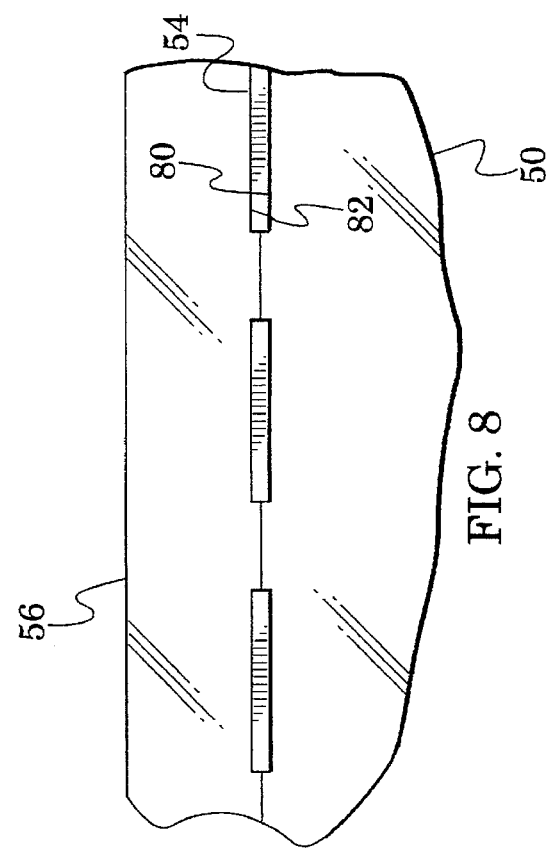
FIG. 8 is a view similar to FIG. 5 illustrating an alternate method for forming the coupler of FIGS. 1 and 2.

FIG. 8 illustrates an alternate fabrication step in which the substrate 50 and cover sheet 56 of FIG. 5 are shaped to define matching channels 80 and 82 which cooperatively receive the optical fibers 54. FIG. 9 illustrates another alternate fabrication step in which the substrate 50 and cover sheet 56 are formed with optically flat opposed surfaces 84 and 86. Spacers 90 are shaped to have substantially the same thickness as the optical fibers 54, and widths that will provide the desired fiber spacing when each spacer 90 is placed between a pair of fibers 54. With the spacers 90 interleaved with the fibers 54 and both captured between the surfaces 84 and 86, the parts are bonded together with epoxy as described above relative to FIGS. 4 and 5.

Figure 11:
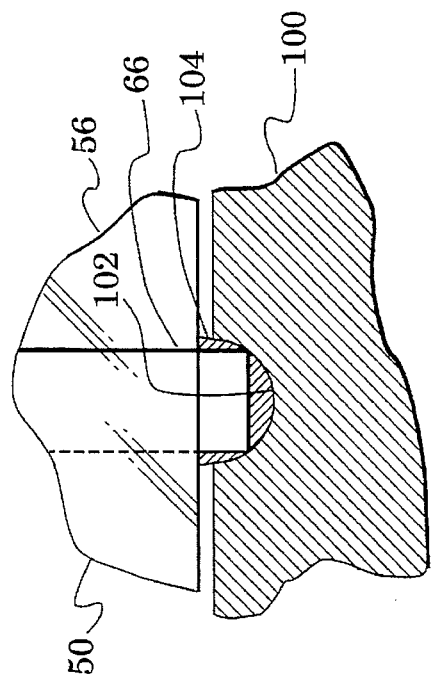
FIG. 11 is an enlarged view which illustrates steps in forming the coupler embodiment of FIG. 10.
Figure 10:
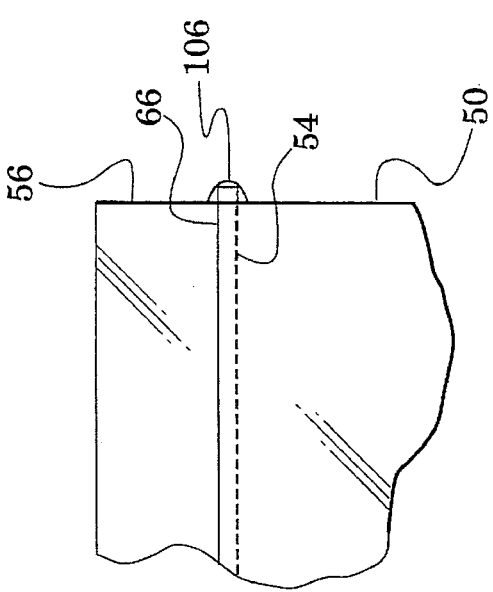
FIG. 10 is an enlarged view similar to FIG. 4 that illustrates another coupler embodiment.

Another method of forming couplers with optical fibers having cylindrical lenses at their entrance ends is illustrated in FIGS. 10 and 11. As seen in FIG. 10, this method starts with an arrangement similar to that of FIG. 4, but the entrance end 66 of each fiber 54 may be flush with or allowed to protrude from the substrate 50 and cover sheet 56. FIG. 11 illustrates one exemplary method which uses a mold 100 that is formed with a concave groove 102 (for clarity of illustration, the mold is shown in section). The groove 102 has a transverse profile which is shaped to form the curved surface 37 of FIG. 3A. The assembly of FIG. 10 is positioned with each fiber entrance end 66 inserted into the groove 102. The groove is then filled with an optical grade plastic 104 which adheres to the entrance end 66 upon hardening. Such plastics can be selected for air curing, temperature curing or ultraviolet light curing.

After the plastic has hardened and adhered to the receiving end 66, the assembly is removed from the mold 100. Each entrance end 66 now carries a cylindrical lens member 106 with a curved surface determined by the transverse profile of the mold groove 102. A significant advantage of this method is that a single mold can be used to form a single lens for a full multiple diode bar. The method illustrated in FIGS. 10 and 11 can be modified to produce fiber entrance ends 66 that have one or more abutment members, e.g., ribs, which prevent damage to the sensitive lens and the sensitive apertures of laser diodes.

Figure 13:
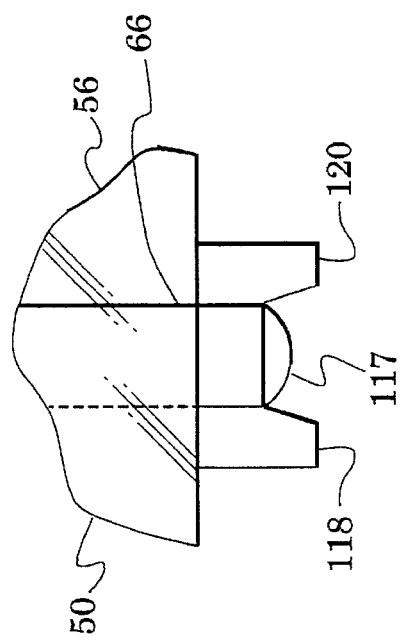
FIG. 13 is a partial view of a coupler embodiment formed in accordance with the method illustrated in FIG. 12.
Figure 12:
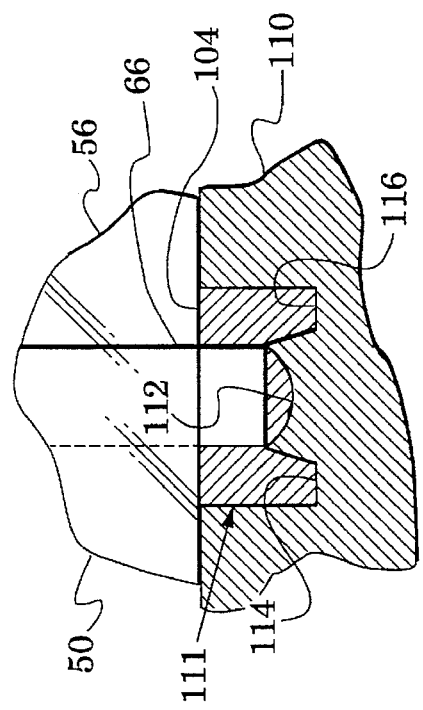
FIG. 12 is a view similar to FIG. 11, illustrating a method of forming another coupler embodiment.

This configuration is produced by modifying the mold 100 to form the mold 110 shown in FIG. 12. The mold 110 has a depression 111 that includes a concave groove 112 positioned between two deeper grooves 114 and 116. The depression 111 is filled with an optical grade plastic 104 to form a cylindrical lens 117 which is carried by the fiber entrance end 66 as shown in FIG. 13. This operation also forms ribs 118 and 120 which are spaced to each side of the lens 117.

The methods illustrated in FIGS. 4–13 can also be used to form simple couplers in the form of discrete rectangular optical fibers that carry a lens at one end. For example, the substrate 50, cover sheet 56 and optical fibers 54 of FIGS. 4 and 5 can be releasably bonded together, e.g., with a wax adhesive. After the lens 70 of FIG. 7 has been formed on each of the fibers, the wax can be removed, e.g., by heating or with a solvent, and the optical fibers removed for separate coupler use. Similar processes can be used with the methods illustrated in FIGS. 10–13 to form discrete optical fibers that carry a lens at one end.

Figure 14A:
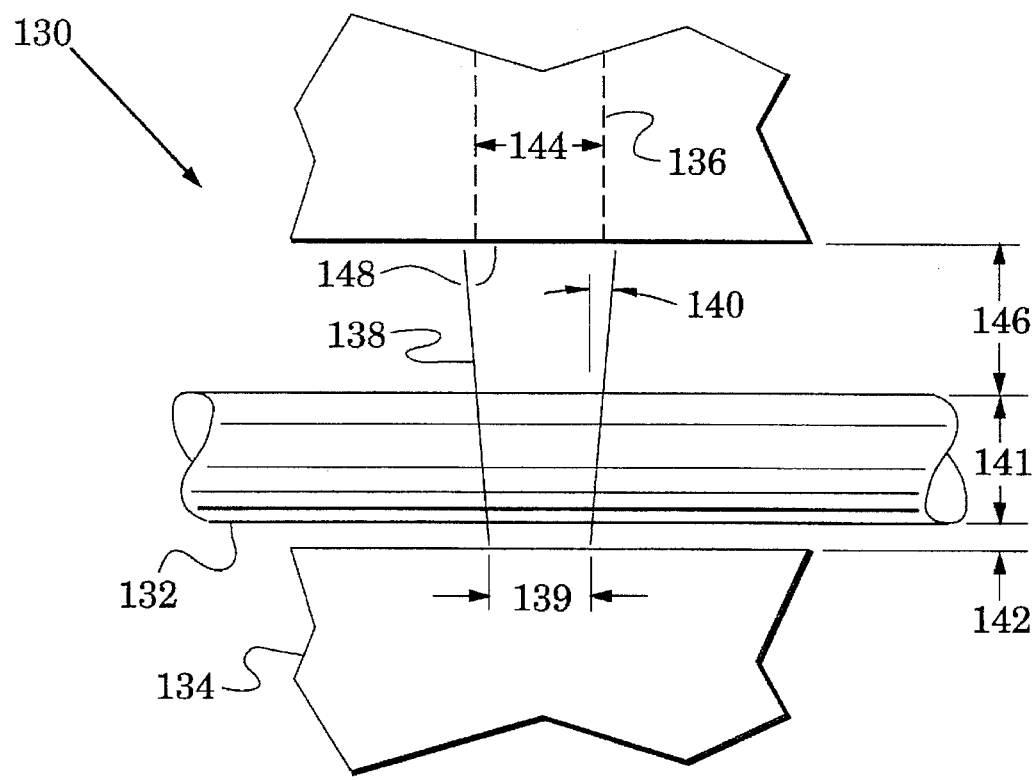
FIG. 14A is a plan view of a conventional coupler assembly.
Figure 14B:
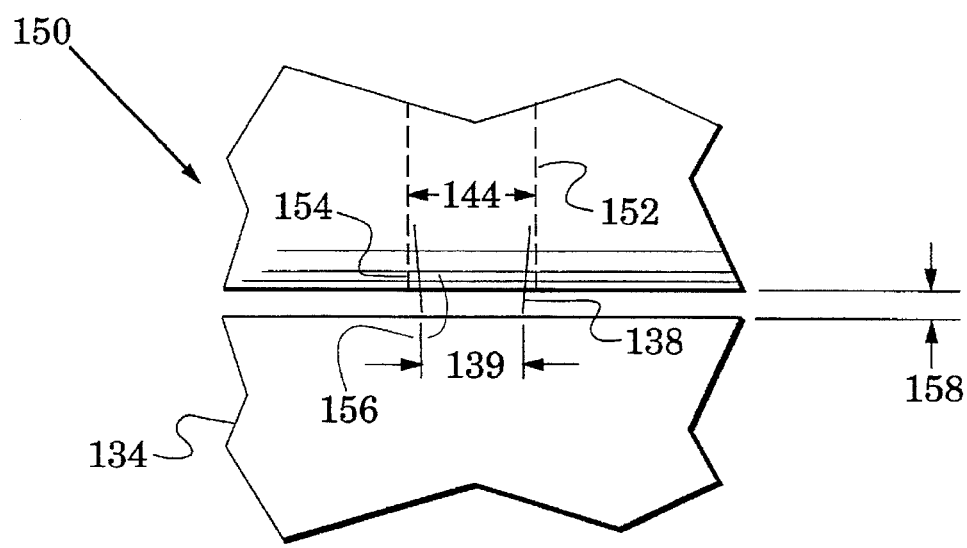
FIG. 14B is a plan view of a coupler embodiment of the present invention.

FIGS. 14A and 14B illustrate the increased power density obtained with the present invention when compared to an exemplary prior apparatus. In FIG. 14A, a prior apparatus 130 is shown with a fiber microlens 132 positioned between a laser emitter 134 and a conduit fiber 136. A laser beam 138 is radiated from an aperture having an initial width 139 (typically 200 microns). The beam 138 has a half angle divergence 140 (typically 5°). The microlens 132 has a diameter 141 (typically 250 microns) and it is separated from the emitter 134 by a space 142 (typically 50 microns). The fiber 136 has a width 144 (typically 250 microns) and is separated from the microlens 132 by a space 146 (typically 300 microns). Slight bending of the beam 138 through the microlens 141 is not shown but a significant loss of energy is apparent at the entrance 148 of the fiber 136.

In contrast, FIG. 14B illustrates an embodiment 150 of the present invention with like elements indicated by like reference numbers. The laser beam 138 is received into a conduit fiber 152 which has its end 154 shaped in a lens 156 (similar to the lens 32A of FIGS. 3A and 3B, the lens 106 of FIG. 10 or the lens 117 of FIG. 13). The lens 156 is separated from the laser emitter 134 by a space 158 which is typically 50 to 100 microns. With the distance between the laser emitter 134 and the receiving conduit fiber shortened because the lens 156 has been formed as an integral part of the fiber 152, more of the energy of the beam 138 is transmitted with identical laser and fiber dimensions. In addition, these figures show that three optical surfaces and their associated losses are encountered in FIG. 14A but only one surface loss is found in the present invention of FIG. 14B.

Although the fiber receiving ends 24 are held in a fixed, spaced relationship in FIGS. 1, 2, 3A and 3B by a retainer 25 in the form of clamp members 26, 28, various other retainer structures well known in the optical art may be used to achieve this relationship. For example, the retainer 25 can be formed by setting the receiving ends 24 in an epoxy or other optically transmitting material.

The couplers of the invention provide simple and efficient coupling between laser diodes and optical fibers. The coupling efficiency (and consequent power density within each fiber) is enhanced because the shape of the rectangular optical fibers of the couplers conforms with that of the rectangular emitting apertures of laser diodes and the laser energy has such a short distance to travel before entering the clad fiber. They are simple to fabricate and are easily positioned as a single assembly for reception of laser diode radiation.

Rectangular optical fibers are typically formed as an integral fiber but other fabrication processes are also conventionally used. In an exemplary technique, a plurality of square fibers are arranged in a row to make up a rectangular cross-sectional shape. The square fibers are then maintained in this arrangement by an envelope of a suitable material, e.g., a polymer. Accordingly, the descriptive term of rectangular optical fiber is directed to the final fiber cross-sectional shape regardless of how that shape is obtained.

Illustrative embodiments have been disclosed of optical couplers that facilitate efficient, time-saving alignments with laser diode sources. The preferred embodiments of the invention described herein are exemplary, and numerous modifications and rearrangements can be readily envisioned to achieve an equivalent result, all of which are intended to be embraced within the scope of the appended claims.

I claim:

1. An optical coupler for receiving radiation which has a radiation numerical aperture, comprising:

a rectangular optical fiber having a pair of broad walls, a pair of narrow walls and a fiber numerical aperture, said optical fiber terminating in a fiber end; and a cylindrical lens formed at said end as integral part of said fiber, said cylindrical lens shaped to define a curved surface whose cross section is arranged substantially parallel with said narrow walls and is configured to reduce said radiation numerical aperture to be less than or equal to said fiber numerical aperture when said radiation is incident upon said lens.

2. The coupler of claim 1, wherein said fiber end is shaped to form said curved surface.

3. The coupler of claim 1, wherein said cylindrical lens comprises a plastic lens member which is molded as an extension of said fiber end.

4. The coupler of claim 3, further including a protective abutment member formed by said lens member to extend past said curved surface for protection of said curved surface.

5. The coupler of claim 1, wherein said curved surface is defined by a constant or other radius of curvature.

6. An optical coupler for receiving a plurality of radiation beams which each have a radiation numerical aperture, comprising:

a plurality of rectangular optical fibers, each having a pair of broad walls, a pair of narrow walls and a fiber numerical aperture, said optical fibers each terminating in a fiber end; and a plurality of cylindrical lenses, each formed across a different one of said ends, each of said cylindrical lenses shaped to define a curved surface whose cross section is arranged substantially parallel with the narrow walls of a respective one of said fibers and is configured to reduce the radiation numerical aperture of a different one of said radiation beams to be less than or equal to said fiber numerical aperture when that radiation beam is incident upon that lens; and a retainer configured to receive and hold said fiber ends in a fixed spatial relationship.

7. The coupler of claim 6 wherein said retainer includes first and second clamp members configured to clamp said fiber ends between said clamp members.

8. The coupler of claim 7, further including a plurality of channels formed by at least one of said clamp members, each of said channels configured to receive a different one of said fibers.

9. The coupler of claim 7, further including a plurality of spacers, each of said spacers positioned between a different pair of said fibers and between said first and second clamp members.

10. The coupler of claim 6, wherein the fiber end of each of said fibers is shaped to form the curved surface of that fiber.

11. The coupler of claim 6, wherein each of said cylindrical lenses comprises a molded extension of its respective fiber.

12. The coupler of claim 11, further including a protective abutment member formed by said fiber extension to extend past said curved surface for protection of said curved surface.

13. The coupler of claim 6, wherein said curved surface is defined by a constant or other radius of curvature.

14. A method of adapting a rectangular optical fiber with a pair of broad walls, a pair of narrow walls and a fiber numerical aperture to receive radiation with a radiation numerical aperture, said method comprising the steps of:

shaping an end of said fiber to form a cylindrical lens with a curved surface whose cross section is substantially parallel with said narrow walls; and configuring said curved surface so that it reduces said radiation numerical aperture to be less than or equal to said fiber numerical aperture when said radiation is incident upon said lens.

15. The method of claim 14, further including the step of releasably capturing said end between first and second clamp members; and wherein said shaping step includes the steps of:

grinding said broad walls to form a substantially V-shaped end; and rounding said V-shaped end.

16. The method of claim 15, wherein said capturing step includes the step of bonding said optical fiber and said clamp members together with a removable adhesive.

17. The method of claim 14, wherein said configuring step includes the step of controlling said shaping step to obtain a constant radius of curvature of said lens.

18. A method of adapting a rectangular optical fiber with a pair of broad walls, a pair of narrow walls and a fiber numerical aperture to receive radiation with a radiation numerical aperture, said method comprising the steps of:

providing a mold having a groove with a transverse profile;

receiving an end of said fiber into said groove with said broad walls substantially parallel with said groove;

filling said groove with a plastic;

allowing said plastic to solidify and adhere to said end, said plastic forming a lens with a curved surface determined by said transverse profile; and configuring said transverse profile so that said curved surface reduces said radiation numerical aperture to be less than or equal to said fiber numerical aperture when said radiation is incident upon said lens.

* * * * *